July 5, 1949.

C. W. BERTHIEZ 2,475,577

CONTROL DEVICE FOR TOOL CARRIERS OF
RECIPROCATING MACHINES

Filed April 11, 1945

Charles William Berthiez
INVENTOR

By George H. Corey
His Attorney

July 5, 1949.

C. W. BERTHIEZ 2,475,577

CONTROL DEVICE FOR TOOL CARRIERS OF
RECIPROCATING MACHINES

Filed April 11, 1945

Charles William Berthiez
INVENTOR
By George H. Corey
His Attorney

Patented July 5, 1949

2,475,577

UNITED STATES PATENT OFFICE 2,475,577

CONTROL DEVICE FOR TOOL CARRIERS OF RECIPROCATING MACHINES

Charles William Berthiez, Paris, France

Application April 11, 1945, Serial No. 587,773
In France November 5, 1943

Section 1, Public Law 690, August 8, 1946
Patent expires November 5, 1963

10 Claims. (Cl. 90—53)

This invention relates to machine tools and the like and more particularly to such machine tools in which reciprocating movement of the tool and workpiece one relative to the other are utilized for doing the work.

Tool carriers for machine tools or the like of the type in which the tool is reciprocated relative to the workpiece and which are operative to effect cutting or other operations in both directions are known, these comprising either a single tool rotatable through 180° at the end of each stroke of the tool carrier or work-piece-carrying table, or, alternatively, a pair of tools or a two-edged tool secured in a carrier or tool holder which is rockable, at the end of each stroke, under the action of electrical or electromechanical means, to bring one or the other of said tools or tool edges into cutting or other working position appropriate for the next reciprocation of the tool carrier or the work-piece. An important disadvantage of such tools as they have been made in the past is that they do not permit the required accuracy of machining and the desired efficiency to be obtained.

It is an object of the present invention to provide an improved device for controlling and operating the tool carrier for such reciprocating machines, for example machine tools, operative in both directions under conditions obviating the aforesaid disadvantage. This improvement is accomplished by interposing between the motor which produces rocking or other movement of the tool carrier or holder and said holder a non-overhauling transmission such as a worm gear, the arrangement being such as to bring about automatic stoppage of the motor once the tool carrier has reached either end of its stroke.

Another object of the invention is to provide an improved device as aforesaid by means of which assurance is secured that the tool carrier will in all cases properly reach the respective ends of its rocking movement and the motor, such as an electric motor, which drives the same can effect a firm clamping action of the tool against the tool carrier, while the disadvantageous influences of clearances or lost motion as may arise from wear and tear will be avoided.

A further object of the invention is to provide an improved device as aforesaid of simple and rugged construction wherein the tool carrier, while capable of being positively rocked in either direction, is properly held in and guided by accurately finished members and also has its rocking movement definitely limited.

With these and other objects in view as will incidentally appear hereinafter, the invention comprises the novel construction and combination of parts that will now be described in detail in the continuation of this specification and with reference to the accompanying drawings exemplifying the same in a convenient embodiment and forming a part of the present disclosure.

Figure 1:
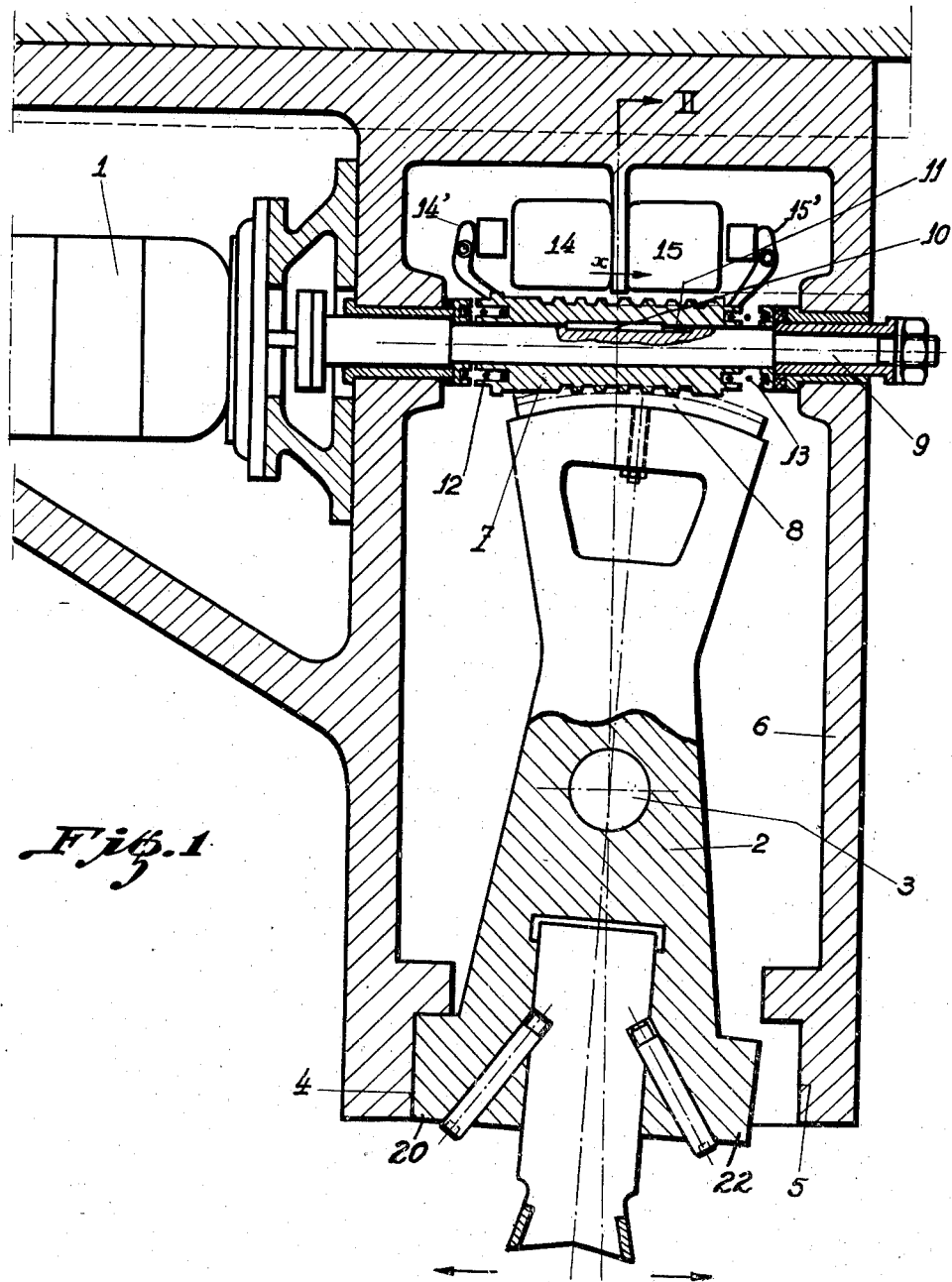
Figure 1 is a vertical sectional view of a device embodying the invention, the positions occupied by the parts corresponding to that of the tool carrier in one of its operative cutting positions.

It will be assumed, by way of example, in the continuation of this specification that the non-overhauling drive or driving connection which transmits the motion of the electric motor 1 to the tool carrier 2 is performed by a worm 7 and a worm wheel sector 8. As shown the tool carrier may be angularly rocked about the pivot 3 so as to cause projections 20, 22 to come into contact with the corresponding one of the side abutments 4, 5 of the machine head 6. Under such conditions, the motor 1 drives the tool carrier 2 through the medium of the worm 7 which meshes with the worm wheel sector 8 carried by the tool carrier 2. However, the worm 7 is adapted to slide along the shaft 9 which is rotated by the motor 1 owing to a feather 10 and a splining groove 11, the groove having a length greater than that of said feather. At both ends, the worm 7 is fitted with compression springs 12, 13 abutted against corresponding shoulder parts of the machine head 6.

Assuming now the motor 1 to be set into motion in a given direction of rotation after the tool and holder have completed the cutting stroke, for example, toward the left in Fig. 1, the motor 1 will impart through the worm 7 and worm gear sector 8 a clockwise angular motion to the tool carrier 2 about the pivot 3 until the projection 20 of the carrier comes into contact with the abutment 4 of the machine head frame 6 by which abutment it is then securely held against further movement in that direction and the tool is in position for cutting movement toward the right. In producing this movement of the sector 8 the worm 7, by reaction, has tended to move toward the left. The spring 12, however, resists this sliding movement of the worm 7. As the motor 1 continues to revolve, after the sector 8 and tool carrier 2 have been stopped by abutment 4 and the shaft 9 thus still revolves the worm 7, the latter is screwed along the worm wheel sector 8 (then held motionless) whereby the worm 7 undergoes a translational motion toward the left along its driving shaft 9, thereby compressing the spring 12. These complementary motions of rotation of the motor 1 and translation of the worm 7 are utilized to cause the motor to be switched off, by means hereafter described, but only after the tool carrier projection 20 has reached the end of its rocking movement stroke and engaged abutment 4. This arrangement insures that the movement of the tool to its new position for the cutting stroke toward the right, as shown in Fig. 1, is fully completed and that thereafter the motor 1 is stopped. It also eliminates the disadvantageous influence of clearances and wear.

The motor 1 may be set in operation when the movable member of the machine tool (tool-carrying head or work-carrying table) reaches the end of its cutting stroke in each direction. This may be accomplished by control means actuated by the usual reversing gear (not shown), the direction of rotation of the motor 1 and of the worm 7 being determined by the position then occupied by one of the contactors 14, 15, for example by the contactor 14 which in Figure 1 was actuated to such position by the previous movement of worm 7 in the direction indicated by the arrow $x$, that is, toward the right in Figure 1.

The motion of the worm 7 along its own axis toward the left as above described has for its effect to operate the contactor 14 to switch the motor 1 off from the current supply for the corresponding direction of rotation of the motor 1 and shaft 9 driving worm 7. Reversal of the movable member of the machine (tool-carrying head or work-carrying table) to move in the direction corresponding to the new position assumed by the tool carrier or holder 2 then may take place, that is, the tool held in the position shown may move toward the right in Figure 1. When the cutting stroke of the tool in the position shown in Figure 1 has been completed the motor 1 is again energized, upon operation of the reversing gear as above mentioned, to rotate in the reverse direction so as to rock the holder 2 upon pivot 3 to the opposite position with the projection 22 in contact with abutment 5. The worm 7 thereupon is moved toward the right, compressing spring 13. The contactor 15 operates in a similar way at this end of the rocking movement of the holder 2 as did the contactor 14 to stop the motor at the other end, as above described. The contactors 14 and 15 are acted upon when the worm 7 reaches the respective ends of its axial movement by means of pivoted levers 14', 15' engaged by the end of the worm 7. Each of the contactors 14 and 15 may be arranged to condition the other for the reverse movement of the motor and of worm 7 when the motor again is energized by the reversing gear of the machine tool so as to produce the proper direction of rotation of the motor and worm.

Figure 2:
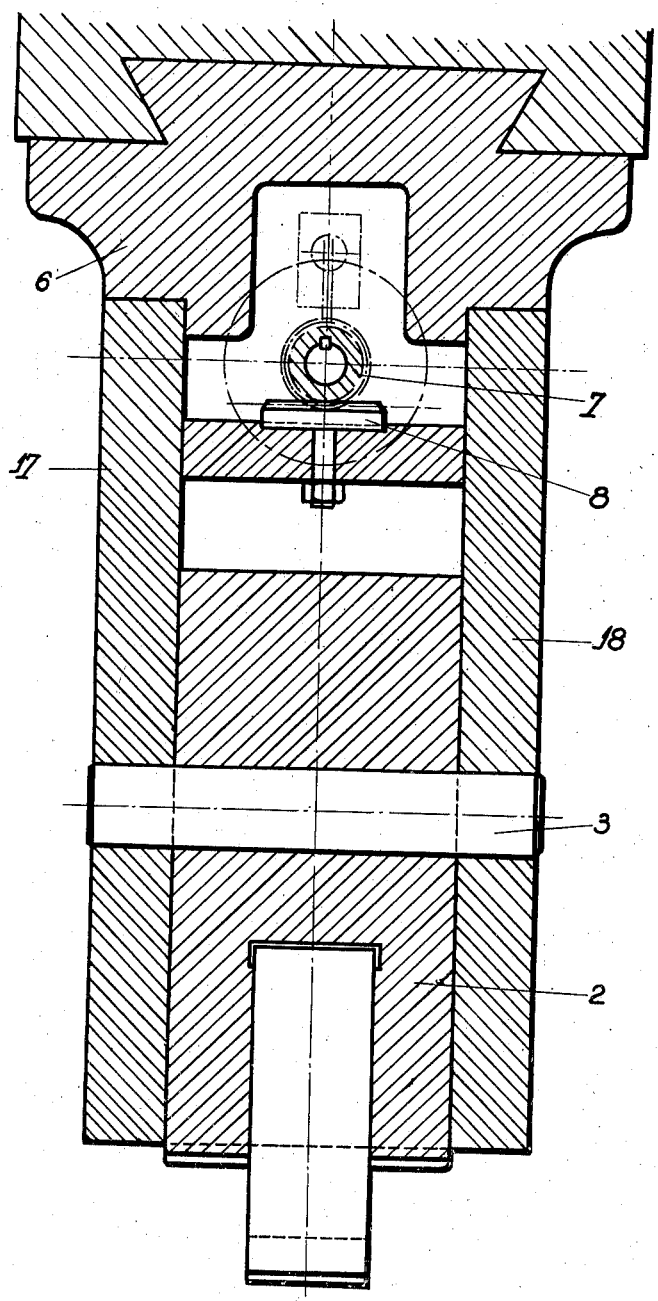
Figure 2 is a vertical sectional view on the line II—II of Figure 1.

It will be observed from Fig. 2 that the tool or holder 2 is guided at its sides between hardened and accurately ground plates 17, 18 which serve to take the sidewise reactions ensuing from the cutting stresses.

In the foregoing exposition the non-overhauling transmission between the motor and the rocking tool carrier 2 has been disclosed in the form of a form and worm wheel sector. It is, however, obvious, that such non-overhauling gear may be constructed otherwise, for example as a worm and nut, the latter driving the tool carrier 2 in rocking movement through any suitable connecting system.

The device according to the invention is applicable to a slotting machine, a shaping machine, an edge planing machine, or any planing machine or other cutting machine having a reciprocating motion producing cuts in each direction and requiring corresponding positions of the cutting tool. Moreover, the device may be utilized for controlling any movable member or part whose motion is limited by a mechanical abutment or by other means, so as to produce by reaction movement of the driving element of the non-overhauling mechanism when the driven element thereof is stopped. This reaction movement may be transmitted by any mechanical, hydraulic or other suitable means instead of by means of the contactors and levers as above described, and motors of other types than the electric motor disclosed which are adaptable for control by such means may be used.

What is claimed is:

1. In a machine for operating on a workpiece with a tool, in combination, means for supporting said tool to be movable between two operative positions thereof in relation to the workpiece, driving means, means providing a non-overhauling driving connection between said driving means and said tool-supporting means for effecting movement of the tool from one position to the other upon operation of said driving means, means effective upon completion of the movement of the tool to said other position for stopping the tool in said other position, and means actuated by said non-overhauling connection upon said stopping of the tool and operatively connected to said driving means to stop said driving means.

2. In a machine for operating on a workpiece with a tool, in combination, a holder for said tool supported to be reciprocable to position the tool successively in two operative positions in relation to said workpiece, a motor adapted to be energized for forward and reverse rotation thereof respectively upon completion of the operations of the tool held in said two positions, means providing a non-overhauling driving connection between said motor and said tool holder to effect movement of said holder in one direction or the other between said two positions in accordance with the forward and reverse rotations of said motor, means effective respectively when said tool reaches said operative positions for stopping movement of said holder while said motor continues to rotate in the direction which produced the movement of said holder to the respective position, control means for said motor, said means providing the non-overhauling driving connection being operatively connected to said motor control means and being actuated by said holder in cooperation with said motor as it continues to run when said holder reaches said respective positions to stop said motor and to condition it for reverse movement thereof.

3. In a machine tool or the like of the type in which cutting operation is effected in each direction of reciprocating movement of the tool relative to the workpiece, in combination, a holder for said tool supported for movement to bring the tool into respective cutting positions for the two directions of said reciprocating movement of the tool relative to said workpiece, a motor adapted to be energized for forward and reverse rotation thereof respectively upon completion of the two reciprocating movements of said tool relative to said workpiece, a worm rotatably driven by said motor, a worm gear meshing with said worm and operatively connected to said tool holder to effect forward and reverse movement thereof respectively upon rotation of said worm by said motor in said forward and reverse directions, means effective for each cutting position of said holder to prevent movement of said holder beyond said position and effective also to stop said worm gear, said worm being supported also for limited axial movement thereof produced by continued rotation thereof after stopping of said worm gear, and means for stopping said motor actuated by said worm upon said axial movement thereof.

4. In a device for supporting a tool in a machine tool or the like in two operative positions for working on a workpiece, in combination, a motor energizable to rotate in forward and reverse directions, a shaft connected to said motor to be rotatably driven thereby correspondingly in forward and reverse directions, a worm mounted on said shaft for rotation therewith and for limited sliding movement to and fro on said shaft, a worm gear segment meshing with said worm and supported for rocking movement thereof upon rotation of said worm in said forward and reverse directions, a tool socket member operatively connected to said worm gear segment and supported to move from one operative position of the tool to the other upon rocking movement of said segment, means for stopping said segment when said tool respectively reaches said two operative positions, whereby upon continued rotation of said motor and of said worm rotating therewith sliding movement of said worm on said shaft is produced in the direction opposite to the movement of said segment, and means actuated by said worm upon reaching the respective ends of its sliding movement for stopping rotation of said motor with said tool in the respective operative position.

5. In the combination as defined in claim 3 said worm being arranged in such relation to said means actuated thereby for stopping said motor as to provide an interval between the stopping of said tool in the operative position to which it is moved and the stopping of said motor.

6. In the combination as defined in claim 3 means effective at each end of said axial movement of said worm to bias said worm against movement toward said end thereof.

7. In a machine tool or the like of the type in which cutting operation is effected in each direction of reciprocating movement of the tool relative to the workpiece, in combination, a holder for said tool reciprocable between two operative positions corresponding to the respective directions of reciprocating movement of the tool relative to the workpiece, an abutment for each position of said holder against which said holder is adapted to abut to prevent movement of said holder beyond said respective positions thereof, driving means, means providing a non-overhauling driving connection between said driving means and said holder to effect movement of said holder between said two operative positions thereof, said driving means being operable in forward and reverse directions correspondingly to effect movement of said holder between said operative positions and to abut said holder in each position against the respective abutment, said non-overhauling driving connection being supported to be reciprocable between two limits of movement thereof and actuatable for said movements by the reaction of the continuing force of said driving means when said holder is prevented by said abutments from moving beyond the respective operative positions thereof, and means actuated by said non-overhauling driving connection upon such movement thereof toward the respective limits of its reciprocating movement for stopping said driving means.

8. In a machine tool or the like of the type in which cutting operation is effected in each direction of the reciprocating movement of the tool relative to the workpiece, in combination, a holder for said tool supported for movement to bring the tool into respective cutting positions for the two directions of said reciprocating movement of the tool relative to said workpiece, driving means adapted to be energized for forward and reverse operation thereof, control means actuated concomitantly with completion respectively of said two reciprocating movements of said tool relative to said workpiece and operatively connected to said driving means to energize said driving means for forward and reverse operation thereof respectively upon such actuations of said control means, a worm rotatably driven by said driving means, a non-overhauling member meshing with said worm and operatively connected to said tool holder to effect forward and reverse movement of said holder between said cutting positions respectively upon rotation of said worm in said forward and reverse directions, means effective for each cutting position of said holder to prevent movement of said holder beyond said position and effective also to stop movement of said meshing non-overhauling member, said worm being supported also for limited axial movement thereof produced by continued rotation thereof after stopping of said non-overhauling member, and means actuated by said worm upon said axial movement thereof and cooperating with said control means for stopping said driving means respectively concomitantly with movement of said holder to said two cutting positions.

9. In a machine tool or the like of the type in which cutting operation is effected in each direction of the reciprocating movement of the tool relative to the workpiece, in combination, a holder for said tool supported for movement to bring the tool into respective cutting positions for the two directions of said reciprocating movement of the tool relative to said workpiece, an electric motor adapted to be energized for forward and reverse rotation thereof, electric control means actuated concomitantly with completion respectively of said two reciprocating movements of said tool relative to said workpiece and connected to said motor to energize said motor for forward and reverse operation thereof respectively upon such actuations of said control means, a worm rotatably driven by said motor, a non-overhauling member meshing with said worm and operatively connected to said tool holder to effect forward and reverse movement of said holder between said cutting positions respectively upon rotation of said worm in said forward and reverse directions, means effective for each cutting position of said holder to prevent movement of said holder beyond said position and effective also to stop movement of said meshing non-overhauling member, said worm being supported also for limited axial movement thereof produced by continued rotation thereof after stopping of said non-overhauling member, and electrical stop means actuated by said worm upon said axial movement thereof for stopping said motor respectively concomitantly with movement of said holder to said two cutting positions, said electrical stop means and said electrical control means being actuated concomitantly to condition said motor for rotation thereof in the direction which is the reverse of that in which it was rotating immediately preceding the stopping thereof.

10. In a machine tool or the like the combination as defined in claim 3 which comprises guide means for preventing substantial movement of said holder transversely of the movement thereof between said two cutting positions.

CHARLES WILLIAM BERTHIEZ.

REFERENCES CITED

The following references are of record in the file of this patent:

UNITED STATES PATENTS

| Number | Name | Date |
|---|---|---|
| 475,004 | Walker | May 17, 1892 |
| 1,478,686 | Teller | Dec. 25, 1923 |
| 1,681,408 | Johannesmeyer et al. | Aug. 21, 1928 |
| 1,739,501 | Cardullo et al. | Dec. 17, 1929 |
| 1,956,023 | Gron | Apr. 24, 1934 |
| 2,317,490 | Simpson | Apr. 27, 1943 |